United States Patent
Cho et al.

(10) Patent No.: US 10,575,334 B2
(45) Date of Patent: Feb. 25, 2020

(54) METHOD AND APPARATUS FOR FAST ACCESS AND METHOD OF SUPPORTING FAST ACCESS IN COMMUNICATION SYSTEM

(71) Applicant: ELECTRONICS AND TELECOMMUNICATIONS RESEARCH INSTITUTE, Daejeon (KR)

(72) Inventors: Seungkwon Cho, Daejeon (KR); Soojung Jung, Daejeon (KR); Taegyun Noh, Daejeon (KR); Anseok Lee, Daejeon (KR); Sung Cheol Chang, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 60 days.

(21) Appl. No.: 15/235,956

(22) Filed: Aug. 12, 2016

(65) Prior Publication Data
US 2017/0048727 A1 Feb. 16, 2017

(30) Foreign Application Priority Data
Aug. 13, 2015 (KR) .................. 10-2015-0114928
Jul. 19, 2016 (KR) .................. 10-2016-0091642

(51) Int. Cl.
*H04W 72/04* (2009.01)
*H04W 72/08* (2009.01)
(Continued)

(52) U.S. Cl.
CPC ....... *H04W 74/0833* (2013.01); *H04L 1/0018* (2013.01); *H04W 28/0278* (2013.01); *H04W 72/0413* (2013.01)

(58) Field of Classification Search
CPC ...... H04W 24/02; H04W 74/08; H04W 72/04
See application file for complete search history.

(56) References Cited

U.S. PATENT DOCUMENTS

| 8,644,292 B2 | 2/2014 | Gorokhov et al. |
| 2007/0291719 A1* | 12/2007 | Demirhan ........... H04W 74/008 370/338 |

(Continued)

FOREIGN PATENT DOCUMENTS

KR 10-2008-0063151 A 7/2008

OTHER PUBLICATIONS

RP-150465, "New SI proposal: Study on Latency reduction techniques for LTE", 3GPP TSG RAN Meeting #67, Shanghai, China, Mar. 9-12, 2015.

(Continued)

*Primary Examiner* — Jinsong Hu
*Assistant Examiner* — Farideh Madani
(74) *Attorney, Agent, or Firm* — Rabin & Berdo, P.C.

(57) ABSTRACT

A terminal of a communication system transmits a first signal through a physical uplink channel that is allocated within a first radio resource based on a first Transmission Time Interval (TTI) having a first time length at a first step for uplink access, performs the remaining steps for the uplink access using a second radio resource based on the second TTI from a base station, when the terminal may operate based on a second TTI having a second time length smaller than the first time length, and transmits uplink data.

3 Claims, 12 Drawing Sheets

(51) Int. Cl.
H04W 24/02       (2009.01)
H04W 74/08       (2009.01)
H04L 1/00        (2006.01)
H04W 28/02       (2009.01)

(56) References Cited

U.S. PATENT DOCUMENTS

| | | | |
|---|---|---|---|
| 2010/0002630 A1* | 1/2010 | Park | H04L 1/1812 |
| | | | 370/328 |
| 2010/0150082 A1 | 6/2010 | Shin et al. | |
| 2011/0141983 A1 | 6/2011 | Hong | |
| 2011/0222499 A1* | 9/2011 | Park | H04W 72/0413 |
| | | | 370/329 |
| 2012/0134438 A1* | 5/2012 | You | H04L 5/0037 |
| | | | 375/279 |
| 2012/0147830 A1* | 6/2012 | Lohr | H04W 72/042 |
| | | | 370/329 |
| 2013/0329711 A1* | 12/2013 | Seo | H04J 11/0069 |
| | | | 370/336 |
| 2015/0036613 A1* | 2/2015 | Seo | H04L 1/1822 |
| | | | 370/329 |
| 2016/0128095 A1* | 5/2016 | Damnjanovic | H04W 72/14 |
| | | | 370/336 |
| 2017/0201908 A1* | 7/2017 | Yan | H04W 28/16 |

OTHER PUBLICATIONS

R2-153548, "Consideration on Random Access for Heterogeneous TTIs in a Carrier", 3GPP TSG-RAN WG2 Meeting #91, Beijing, China, Aug. 24-28, 2015.

* cited by examiner

METHOD AND APPARATUS FOR FAST ACCESS AND METHOD OF SUPPORTING FAST ACCESS IN COMMUNICATION SYSTEM

CROSS-REFERENCE TO RELATED APPLICATION

This application claims priority to and the benefit of Korean Patent Application No. 10-2015-0114928 and 10-2016-0091642 filed in the Korean Intellectual Property Office on Aug. 13, 2015 and Jul. 19, 2016, the entire contents of which are incorporated herein by reference.

BACKGROUND OF THE INVENTION

(a) Field of the Invention

The present invention relates to a method and apparatus for fast access and a method of supporting fast access in a communication system. More particularly, the present invention relates to a method and apparatus that enable fast access using two Transmission Time Intervals (TTIs) having different time lengths.

(b) Description of the Related Art

In a communication system that is formed with at least one terminal and a base station, when transmitting data from the terminal to the base station or from the base station to the terminal, technology that reduces latency that is taken from a time point at which data arrive at a transmitting buffer of the terminal or the base station to a time point at which transmission is complete to the base station or the terminal, which is the final receiving side has been recently described as technology necessary for 5-th Generation (5G) communication.

Specifically, according to a document on a vision of 5G mobile communication that was agreed on June, 2015 in ITU Radiocommunication Sector (ITU-R), it is determined that latency reduction will be core contents in a future communication system such that one of eight core performance indexes is determined to latency.

Accordingly, a research of reducing a Transmission Time Interval (TTI) has been performed. A TTI is a minimum transmitting time interval in which a terminal or a base station transmits data, and for example, in a mobile WiMAX communication system based on IEEE 802.16e, the TTI is 5 ms, and in Long Term Evolution (LTE) and LTE-Advanced (A) communication systems based on 3GPP Release 8-Release 12, the TTI is 1 ms.

Most communication systems should consider backward compatibility when reducing a TTI. When a TTI of an existing communication system is defined to a normal TTI and when a new TTI having a time length smaller than that of a normal TTI is defined to a short TTI, backward compatibility means that a terminal that supports only an existing normal TTI should be able to access to a base station that supports a new short TTI.

In order to support backward compatibility in addition to a radio resource based on a short TTI, a base station of a communication system that supports a short TTI always has a radio resource based on a normal TTI.

Up to now, in a communication system, even if a base station has one carrier or a plurality of carriers, an entire carrier has a radio resource based on the same TTI. Therefore, when the communication system has heterogeneous TTIs, in consideration of consideration contents upon designing various systems, such as an impact on an existing specification of the communication system, a system overhead, and complexity increase of a terminal and base station according to a new physical channel design, technology that can reduce latency by efficiently using a radio resource of a short TTI is not suggested.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for fast access and a method of supporting fast access in a communication system that enables fast access through latency reduction.

An exemplary embodiment of the present invention provides a fast uplink access method of transmitting data from a terminal of a communication system. The fast access method includes: transmitting a first signal through a physical uplink channel that is allocated within a first radio resource based on a first Transmission Time Interval (TTI) having a first time length at a first step for uplink access; performing, when the terminal may operate based on a second TTI having a second time length smaller than the first time length, the remaining steps for the uplink access using a second radio resource based on the second TTI from a base station; and transmitting uplink data.

The first signal may be a bandwidth request signal, and the physical uplink channel may be a bandwidth request channel.

The first signal may be a Buffer Status Report (BSR) signal, and the physical uplink channel may be an uplink sharing traffic channel.

The transmitting of a first signal may include: resetting, when the terminal operates based on the first TTI, 1 bit of flag that is included in the first signal; and setting, when the terminal operates based on the second TTI, 1 bit of flag that is included in the first signal.

The first signal may be a random access preamble signal, and the physical uplink channel may be a dedicated random access channel.

The transmitting of a first signal may include: transmitting, when the terminal operates based on the first TTI, one of a plurality of first random access preambles with the first signal; and transmitting, when the terminal operates based on the second TTI, one of a plurality of second random access preambles with the first signal.

The performing of the remaining steps may include: receiving, by the base station, having received the second random access preamble, a random access response that is transmitted using the second radio resource; transmitting a Buffer Status Report (BSR) using the second radio resource; and receiving, by the base station, an uplink grant including uplink resource allocation information that is transmitted using the second radio resource.

The performing of the remaining steps may include: transmitting, by the base station, each random access response that is transmitted using the first radio resource and the second radio resource; receiving, by the base station, a random access response that is transmitted using the second radio resource, when the terminal operates based on the second TTI; transmitting a Buffer Status Report (BSR) using the second radio resource; and transmitting, by the base station, an uplink grant including uplink resource allocation information that is transmitted using the second radio resource.

Another embodiment of the present invention provides a method in which a base station of a communication system supports fast uplink access of a terminal. The method includes: receiving a first signal that is transmitted from the terminal through a physical uplink channel that is allocated within a first radio resource based on a first Transmission Time Interval (TTI) having a first time length at a first step for the uplink access; performing, when the terminal may operate based on a second TTI having a second time length smaller than the first time length, the remaining steps for the uplink access using a second radio resource based on the second TTI; and receiving uplink data that are transmitted from the terminal.

The performing of the remaining steps may include determining whether the terminal is a terminal operating based on the first TTI or a terminal operating based on the second TTI with the first signal.

The receiving of a first signal may include: transmitting, by a terminal operating based on the first TTI, one of a plurality of first random access preambles with the first signal; and transmitting, by a terminal operating based on the second TTI, one of a plurality of second random access preambles with the first signal.

The first signal may be a random access preamble, and the physical uplink channel may be a dedicated random access channel.

The performing of the remaining steps may include: transmitting each random access response to the random access preamble using the first radio resource and the second radio resource; and determining that the terminal is a terminal that may operate based on the second TTI, when receiving a Buffer Status Report (BSR) from the terminal using the second radio resource.

The first signal may be a bandwidth request signal, and the physical uplink channel may be a bandwidth request channel.

The determining of whether the terminal is a terminal may include: determining whether the terminal is a terminal operating based on the first TTI or a terminal operating based on the second TTI; allocating a bandwidth request signal in which the terminal is to use; and determining whether the terminal is a terminal that may operate based on the second TTI from a bandwidth request signal that is received from the terminal.

The first signal may be a Buffer Status Report (BSR) signal, and the physical uplink channel may be an uplink sharing traffic channel.

The determining of whether the terminal is a terminal may include: determining that the terminal may operate based on the second TTI, when a flag value of the BSR signal is set; and determining that the terminal operates based on the first TTI, when a flag value of the BSR signal is reset.

The determining of whether the terminal is a terminal may include: confirming an identifier of the terminal from the received BSR signal; determines a type of the terminal using the identifier of the terminal, by referring to types of terminals stored corresponding to identifiers of the terminals; and determining that the terminal may operate based on the send TTI based on the type of the terminal.

Yet another embodiment of the present invention provides a fast uplink access apparatus for enabling a terminal to transmit data in a communication system. The fast access apparatus includes a processor and a transceiver. The processor performs a first step of an uplink access procedure through a physical uplink channel that is allocated within a first radio resource based on a first Transmission Time Interval (TTI) having a first time length and performs a final data transmission step from a second step using a second radio resource based on the second TTI from a base station, when the terminal may operate based on a second TTI having a second time length smaller than the first time length. The transceiver is connected with the processor and transmits and receives a wireless signal according to the uplink access procedure to and from the base station.

The processor may transmit one of a random access preamble, a bandwidth request signal, and a Buffer Status Report (BSR) through the transceiver at the first step.

DETAILED DESCRIPTION OF THE EMBODIMENTS

Figure 1:
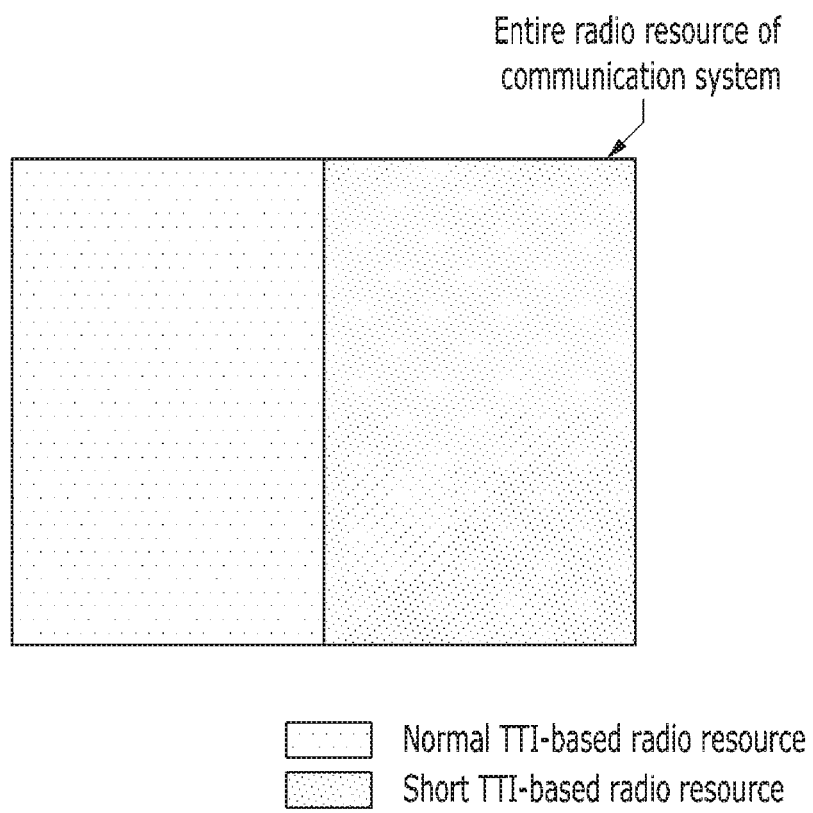
FIG. 1 is a diagram conceptually illustrating a radio resource of a communication system according to a kind of TTIs according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification and claims, unless explicitly described to the contrary, the word "comprise" and variations such as "comprises" or "comprising", will be understood to imply the inclusion of stated elements but not the exclusion of any other elements.

In an entire specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and an user equipment (UE) and may include an entire function or a partial function of the MT, the MS, the AMS, the HR-MS, the SS, the PSS, the AT, and the UE.

Further, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a BS function, a relay node (RN) that performs a BS function, an advanced relay station (ARS) that performs a BS function, a high reliability relay station (HR-RS) that performs a BS function, and a small BS[a femto BS, a home node B (HNB), a home eNodeB (HeNB), a pico BS, a metro BS, and a micro BS] and may include an entire function or a partial function of the ABS, the nodeB, the eNodeB, the AP, the RAS, the BTS, the MMR-BS, the RS, the RN, the ARS, the HR-RS, and the small BS.

Hereinafter, a method and apparatus for fast access and a method of supporting fast access in a communication system according to an exemplary embodiment of the present invention will be described in detail with reference to the drawings.

When a communication system has both a short TTI-based radio resource and a normal TTI-based radio resource, it is defined that the communication system has heterogeneous TTIs. Here, a normal TTI and a short TTI are a relative concept that is determined through time length comparison of two TTIs instead of being divided by an absolute time length reference.

Further, a carrier having both a normal TTI-based radio resource and a short TTI-based radio resource within a carrier is defined to a carrier with heterogeneous TTIs, a carrier having only a normal TTI-based radio resource within a carrier is defined to a carrier with only normal TTI, and a carrier having only a short TTI-based radio resource within a carrier is defined to a carrier with only short TTI.

A communication system having a heterogeneous TTI-based radio resource according to an exemplary embodiment of the present invention using a definition of a heterogeneous TTI carrier, a carrier with only normal TTI, and a carrier with only short TTI is applied to an entire case belonging to two classifications.

When the number of carriers in which the communication system uses is N (N is the natural number equal to or larger than 1), in classification 1, N=1 and in classification 2, N>1.

In classification 1, the communication system uses one carrier, and a corresponding carrier is a heterogeneous TTI carrier.

In classification 2, the communication system may use the J-number of heterogeneous TTI carriers, the K-number of carriers with only short TTI, and the L-number of carriers with only short TTI. In this case, J≥0, K≥0, L≥0 and J+K+L=N.

For example, there are two carriers in which the communication system uses; one carrier thereof may be a carrier with only normal TTI and the other carrier may be a carrier with only short TTI. In this case, in classification 2, N=2, J=0, K=1, and L=1.

Further, there are two carriers in which the communication system uses; one carrier thereof may be a heterogeneous TTI carrier and the other carrier may be a carrier with only normal TTI. In this case, in classification 2, N=2, J=1, K=1, and L=0.

A case in which the communication system has a plurality of carriers may be, for example, a method such as Carrier Aggregation (CA) or Dual Connectivity of an LTE or LTE-A communication system based on 3GPP specification and a multicarrier operation of a mobile WiMAX system based on IEEE 802.16 series specification.

FIG. 1 is a diagram conceptually illustrating a radio resource of a communication system according to a kind of TTIs according to an exemplary embodiment of the present invention.

Referring to FIG. 1, an entire radio resource of a communication system may be divided into a normal TTI-based radio resource and a short TTI-based radio resource. In this case, an area of the normal TTI-based radio resource and an area of the short TTI-based radio resource of FIG. 1 do not represent a relative ratio of a physical resource amount.

Figure 2:
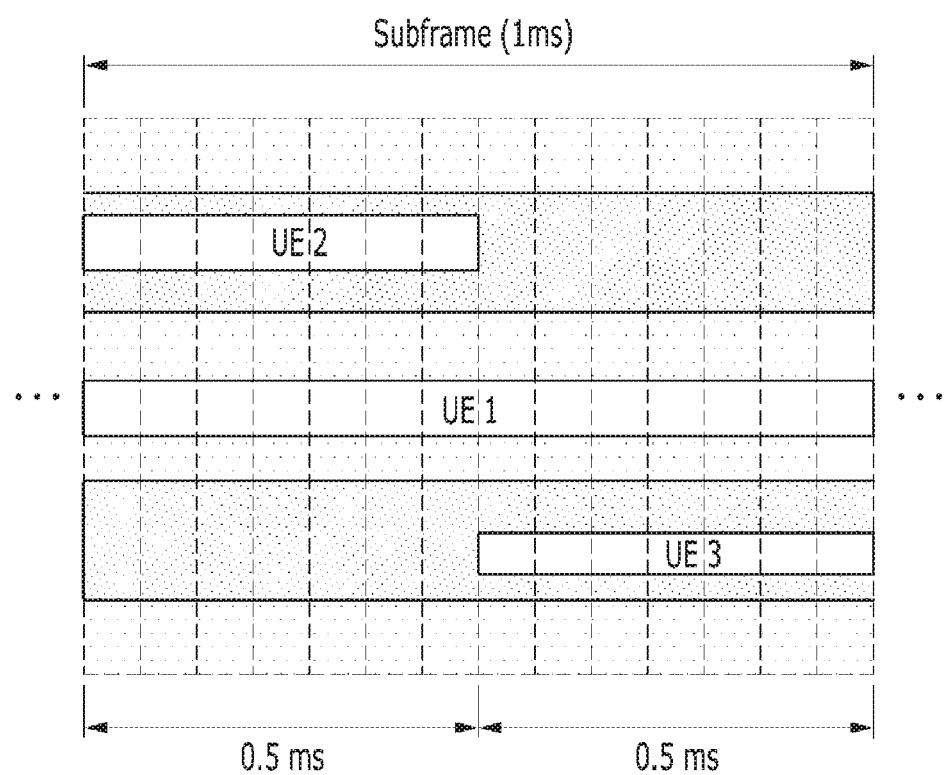
FIG. 2 is a diagram illustrating an example of a radio resource of heterogeneous TTIs according to a subframe structure of a communication system according to an exemplary embodiment of the present invention.

FIG. 2 is a diagram illustrating an example of a radio resource of heterogeneous TTIs according to a subframe structure of a communication system according to an exemplary embodiment of the present invention, and FIG. 2 illustrates a case in which a 3GPP LTE or LTE-A communication system of a Frequency Division Duplex (FDD) method has a normal TTI of a length 1 ms within an uplink subframe and a short TTI of a length 0.5 ms.

Referring to FIG. 2, a normal TTI-based radio resource and a short TTI-based radio resource within an uplink subframe may be alternately allocated based on a frequency shaft. A carrier having such an uplink subframe structure corresponds to a heterogeneous carrier having both a normal TTI-based radio resource and a short TTI-based radio resource.

Further, as shown in FIG. 2, in a normal TTI-based radio resource and a short TTI-based radio resource, a radio resource is allocated to each of UE1, UE2, and UE3. For example, a portion of a normal TTI-based radio resource may be allocated to the UE1, and a portion of a short TTI-based radio resource may be allocated to the UE2 and the UE3.

In a communication system, there are various uplink access schemes in which the terminal transmits data to the base station. For example, in an LTE system, an uplink access scheme may include a random access method of using a Physical Random Access Channel (PRACH), a method by a Scheduling Request (SR) using a Physical Uplink Control Channel (PUCCH), a method by a Buffer Status Report (BSR), a method by Semi-persistent scheduling (SPS), and a method by pre-allocation.

Figure 3:
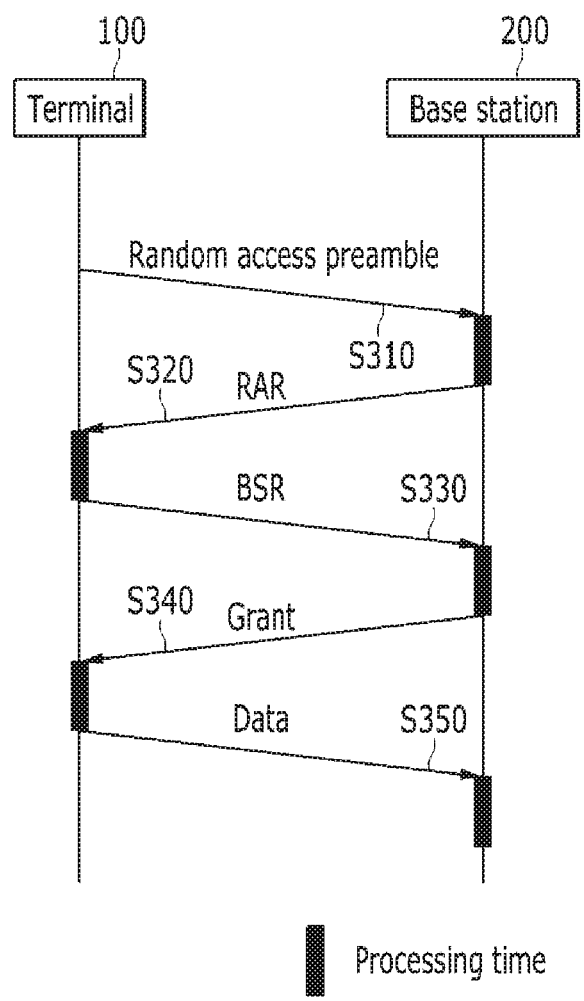
FIG. 3 is a flowchart illustrating a random access method of using a PRACH in existing LTE and LTE-A communication systems.

FIG. 3 is a flowchart illustrating a random access method of using a PRACH in existing LTE and LTE-A communication systems.

Referring to FIG. 3, a terminal 100 transmits a random access preamble through a PRACH (step 1, S310).

When receiving a random access preamble, the base station 200 transmits a Random Access Response (RAR) to the terminal 100 in a response to the random access preamble (step 2, S320).

The terminal 100, having received the RAR transmits a Layer 2 (L2) or Layer 3 (L3) message to the base station 200 (step 3, S330). Hereinafter, it is assumed that a BSR as an L2 message is transmitted.

The base station 200 transmits grant, which is an uplink grant (uplink resource use authorization message) in a response to of the received BSR to the terminal 100 (step 4, S340).

Thereafter, the terminal 100 transmits data to the base station 200 using an allocated uplink resource (step 5, S350).

Such a random access method is substantially the same as random access of mobile WiMAX. The mobile WiMAX communication system transmits a ranging code at step 1 (S310), responds using a MAP message at step 2 (S320), transmits a bandwidth request message at step 3 (S330), allocates an uplink resource through a MAP message at step 4 (S340), and finally transmits uplink data at step 5 (S350). Further, a LTE/LTE-A communication system or a mobile WiMAX communication system uses a dedicated uplink channel at step 1 (S310).

In such existing LTE and LTE-A communication systems, a random access method of using a PRACH is performed using a normal TTI-based radio resource.

In a communication system having a heterogeneous TTI-based radio resource according to an exemplary embodiment of the present invention, in order to support backward compatibility, a normal TTI-based dedicated random access channel should always exist.

However, in a communication system having a heterogeneous TTI-based radio resource, a short TTI-based dedicated random access channel may not exist within a communication system due to the following reason or other reasons. A resource that is used for an dedicated uplink channel for step 1 (S310) operates as an overhead of the communication system. This is because even if a load of a random access channel is temporarily low, an amount of a resource that is used for a dedicated random access channel is not dynamically changed. Therefore, from a system overhead viewpoint, when a normal TTI-based dedicated random access channel exists, a short TTI-based dedicated random access channel may not exist within a communication system.

Further, when designing/implementing a communication system having a heterogeneous TTI-based radio resource, due to complexity of a product and complexity of a design necessary for a new dedicated random access channel that is designed to be appropriate to a short TTI resource, a product cost may increase. Therefore, when a normal TTI-based dedicated random access channel exists, a short TTI-based dedicated random access channel may not exist within a communication system.

Due to other various reasons, in a communication system having a heterogeneous TTI-based radio resource, a short TTI-based dedicated random access channel may not exist.

Further, in a communication system having a heterogeneous TTI-based radio resource, even if a short TTI-based dedicated random access channel exists, a terminal that may operate based on a short TTI may use a normal TTI-based dedicated random access channel at step 1 (S310) of a random access procedure due to several reasons. For example, because a load of a short TTI-based dedicated random access channel is high, when a random access failure probability is very high, a terminal that may operate based on a short TTI may use a normal TTI-based dedicated random access channel.

Further, in a communication system having a heterogeneous TTI-based radio resource due to various reasons, even if a short TTI-based dedicated random access channel exists, the terminal may use a normal TTI-based dedicated random access channel at step 1 (S310) of a random access procedure.

Hereinafter, when a communication system having a heterogeneous TTI-based radio resource according to an exemplary embodiment of the present invention performs a random access procedure, a method in which the communication system performs step 1 using a normal TTI-based dedicated random access channel and performs step 2 and subsequent steps using a short TTI-based radio resource will be described in detail.

Figure 4:
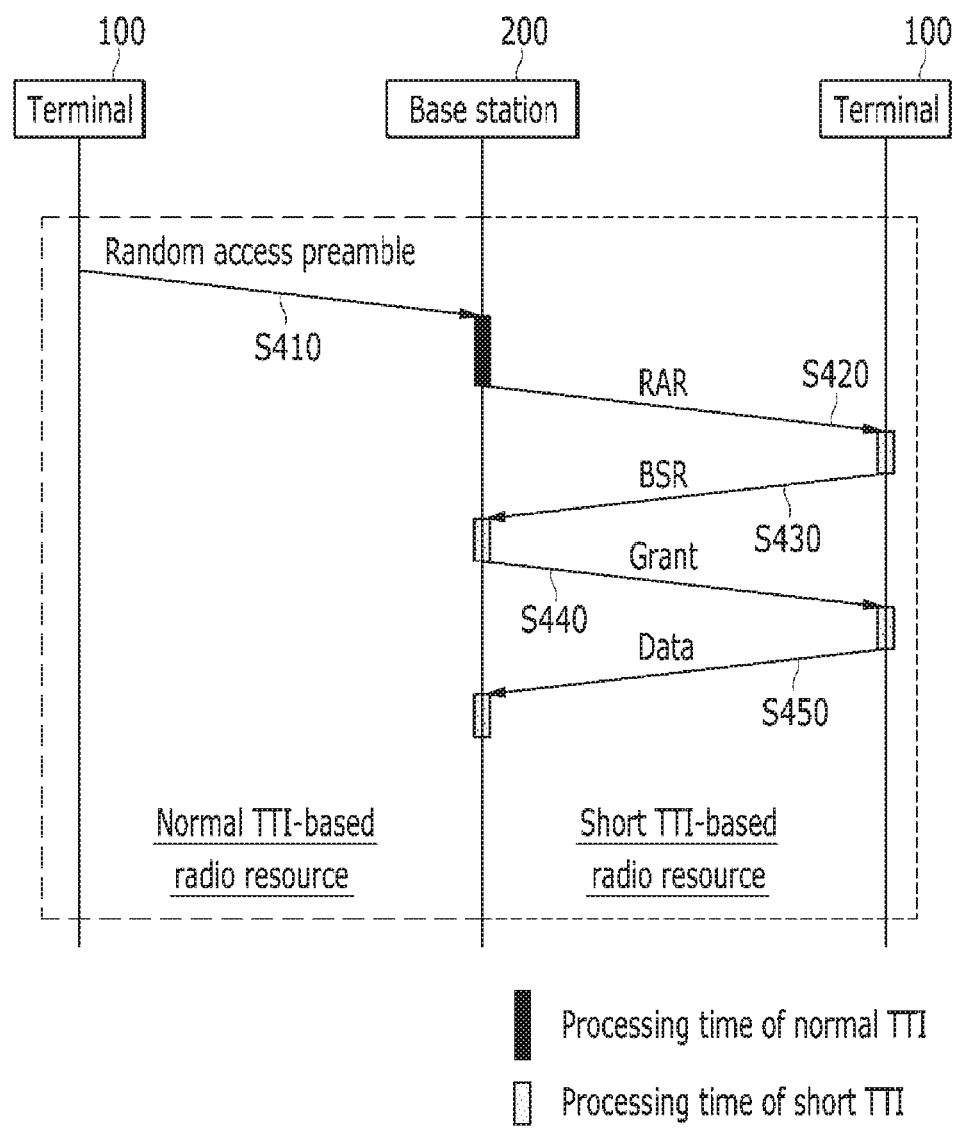
FIG. 4 is a flowchart illustrating a random access method in a communication system having a heterogeneous TTI-based radio resource according to an exemplary embodiment of the present invention.

FIG. 4 is a flowchart illustrating a random access method in a communication system having a heterogeneous TTI-based radio resource according to an exemplary embodiment of the present invention.

In FIG. 4, a left terminal 100 and a right terminal 100 are disposed about a base station 200, but the left terminal 100 and the right terminal 100 are not different terminals but are the same terminal and are used for distinguishing a case of using a normal TTI-based radio resource and a case of using a short TTI-based radio resource.

Referring to FIG. 4, the terminal 100 transmits a random access preamble using a normal TTI-based dedicated random access channel (step 1, S410). In LTE and LTE-A communication systems, a dedicated random access channel may mean a PRACH.

Thereafter, the terminal 100 and the base station 200 may perform step 2 to step 5 using a short TTI-based radio resource (S420-S450).

In this way, because a communication system having a heterogeneous TTI-based radio resource uses a short TTI-based radio resource at step 2 to step 5 (S420-S450), a processing time at the terminal 100 and the base station 200 is short, compared with a case of using a normal TTI-based radio resource and thus latency that is taken to data transmission is reduced and fast access is thus available.

Figure 5:
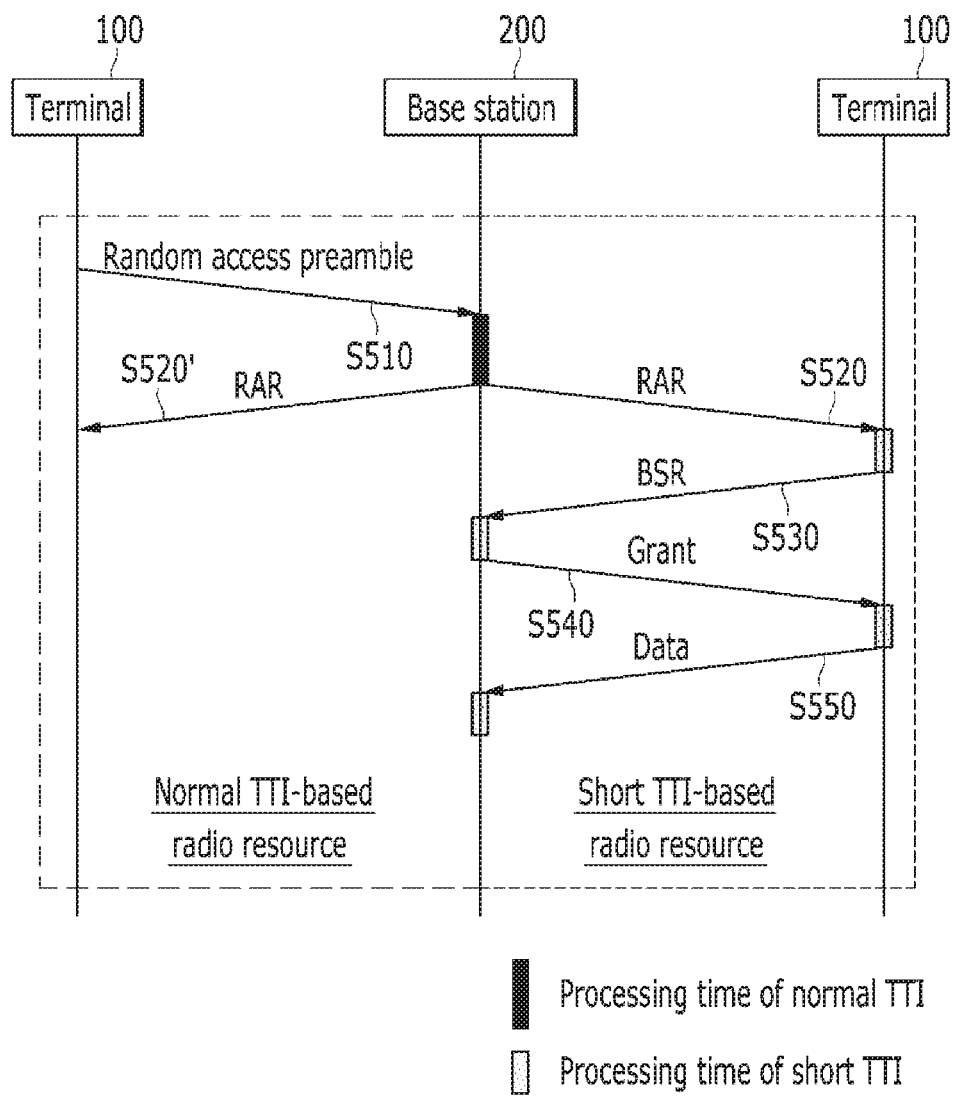
FIG. 5 is a flowchart illustrating an example of a method of enabling to use a short TTI-based radio resource at step 2 and subsequent steps in the random access method of FIG. 4.

FIG. 5 is a flowchart illustrating an example of a method of enabling to use a short TTI-based radio resource at step 2 and subsequent steps in the random access method of FIG. 4.

Referring to FIG. 5, the terminal 100 transmits a random access preamble using a normal TTI-based dedicated random access channel (step 1, S510).

Thereafter, the terminal 100 and the base station 200 performs step 2 to step 5 using a short TTI-based radio resource (S520-S550).

In this way, in order to enable to use a short TTI-based radio resource at step 2 (S520) and subsequent steps, the base station 200, having received a random access preamble in which a terminal that may use the short TTI-based radio resource, i.e., the terminal 100 that may operate based on a short TTI has transmitted using a normal TTI-based dedicated random access channel at step 1 (S510) transmits a RAR to the terminal 100 using a short TTI-based radio resource and a normal TTI-based radio resource in response to the random access preamble (S520, S520'). In this case, the base station 200 may transmit the RAR using a short TTI-based radio resource and a normal TTI-based radio resource at the same time and may transmit the RAR using a short TTI-based radio resource and a normal TTI-based radio resource at different times.

After step 2 (S520, S520'), the base station 200 transmits a response signal to a signal that is received at a normal TTI-based radio resource using the normal TTI-based radio resource and transmits a response signal to a signal that is received at a short TTI-based radio resource using the short TTI-based radio resource.

That is, the terminal 100 that may operate based on a short TTI performs step 1 (S510) and monitors only a short TTI-based radio resource, thereby receiving a RAR in which the base station 200 transmits at step 2 (S520) using a short TTI-based radio resource. Therefore, the terminal 100 that may operate based on a short TTI may perform step 2 (S520) to step 5 (S550) using a short TTI-based radio resource.

When the terminal 100 is a terminal operating based on a normal TTI, the terminal 100 may use only a normal TTI-based radio resource and thus the terminal 100 performs step 1 (S510) and monitors only a normal TTI-based radio resource, thereby receiving only a RAR in which the base station 200 transmits using a normal TTI-based radio resource at step 2 (S520). Therefore, the terminal operating based on a normal TTI may perform entire operation of subsequent RAR reception, BSR transmission, grant reception, and data transmission based on a normal TTI. FIG. 5 illustrates that the terminal 100 is a terminal operating based on a short TTI.

In this way, a communication system having a heterogeneous TTI-based radio resource according to an exemplary embodiment of the present invention enables the terminal 100 that may operate based on a short TTI to use a short TTI-based radio resource until terminating entire operation of step 2 (S520) and subsequent steps while guaranteeing operation of a terminal operating based on a normal TTI. Therefore, compared with an uplink access procedure using a normal TTI-based radio resource, an access time that is taken for final data transmission is shortened.

Figure 6:
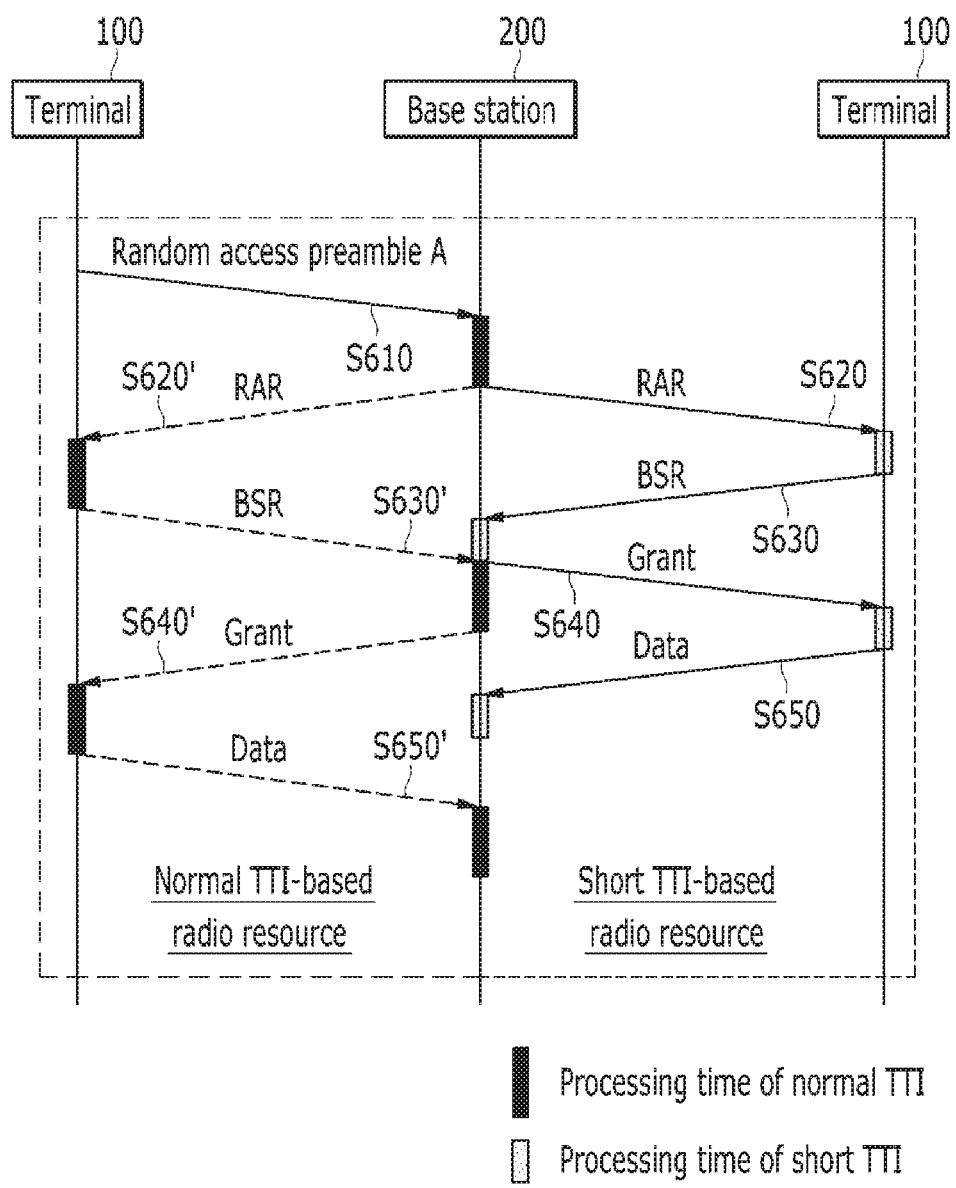
FIG. 6 is a flowchart illustrating another example of a method of enabling a terminal that may operate based on a short TTI in the random access method of FIG. 4 to use a short TTI-based radio resource at step 2 and subsequent steps.

FIG. 6 is a flowchart illustrating another example of a method of enabling a terminal that may operate based on a short TTI in the random access method of FIG. 4 to use a short TTI-based radio resource at step 2 and subsequent steps.

An existing communication system determines a kind of physical signals in which the terminal 100 transmits using a dedicated random access channel at step 1 to the X-number (X is the natural number larger than 0), and a plurality of terminals 100 share the physical signals. The terminal 100 attempting random access selects one of the X-number of physical signals and transmits the physical signal at step 1. For example, in an LTE/LTE-A communication system, the terminal 100 may select one of 64 random access preambles and transmit the selected random access preamble at step 1.

In this case, in order to enable to use a short TTI-based radio resource at step 2 and subsequent steps, in an exemplary embodiment of the present invention, when the number of a physical signal in which a terminal operating based on a normal TTI may use at step 1 is the total X-number, a physical signal in which a terminal that may operate based on a short TTI may use at step 1 is separately defined. That is, for a terminal that may operate based on a short TTI, separate Y-number (Y is the natural number larger than 0) of physical signals different from a physical signal in which a terminal operating based on a normal TTI may use at step 1 are defined. Therefore, a terminal that may operate based on a short TTI selects one of the Y-number of physical signals and transmits the physical signal at step 1. For example, in an LTE/LTE-A communication system, entire 64 random access preambles may be used at step 1. Only a terminal operating based on a normal TTI uses existing 64 random access preambles. For a terminal that may operate based on a short TTI, separate Y-number of random access preambles different from existing 64 random access preambles are defined, and a terminal that may operate based on a short TTI uses additional Y-number of random access preambles.

Referring to FIG. 6, the terminal 100 that may operate based on a short TTI uses a normal TTI-based dedicated random access channel but selects and transmits one of separate Y-number of random access preambles (step 1, S610).

When the received random access preamble is one of X-number of random access preambles, the base station 200 transmits an RAR to the terminal 100 using a normal TTI-based radio resource (step 2, S620'). Alternatively, when the received random access preamble is one of additional Y-number of random access preambles, the base station 200 transmits an RAR to the terminal 100 using a short TTI-based radio resource (step 2, S620).

After step 2 (S620', S620), the base station 200 transmits a response signal to the signal that is received in the normal TTI-based radio resource using the normal TTI-based radio resource and transmits a response signal to the signal that is received in the short TTI-based radio resource using the short TTI-based radio resource.

Unlike FIG. 5, when performing step 2 (S620, S620'), a method of FIG. 6 has differentiation in which the base station 200 transmits an RAR to the terminal 100 using only one of the normal TTI-based radio resource and the short TTI-based radio resource.

The terminal 100 that may operate based on a short TTI performs step 1 (S610) and monitors only a short TTI-based radio resource, thereby receiving an RAR in which the base station 200 transmits at step 2 (S620) using a short TTI-based radio resource. Therefore, the terminal 100 that may operate based on a short TTI may perform step 2 (S620) to step 5 (S650) using a short TTI-based radio resource.

Because the terminal operating based on a normal TTI uses only a normal TTI-based radio resource, the terminal performs step 1 (S610) and monitors only a normal TTI-based radio resource, thereby receiving only an RAR in which the base station 200 transmits using a normal TTI-based radio resource at step 2 (S620'). Therefore, the terminal operating based on a normal TTI may perform subsequent entire operation using a normal TTI-based radio resource.

In this way, by determining whether to use a normal TTI-based radio resource or a short TTI-based radio resource using a random access preamble in which the terminal 100 transmits, while guaranteeing operation of the terminal 100 operating based on a normal TTI, the base station 200 enables the terminal 100 that may operate based on a short TTI to use a short TTI-based radio resource until terminating entire operation of step 2 (S620) and subsequent steps.

Figure 7:
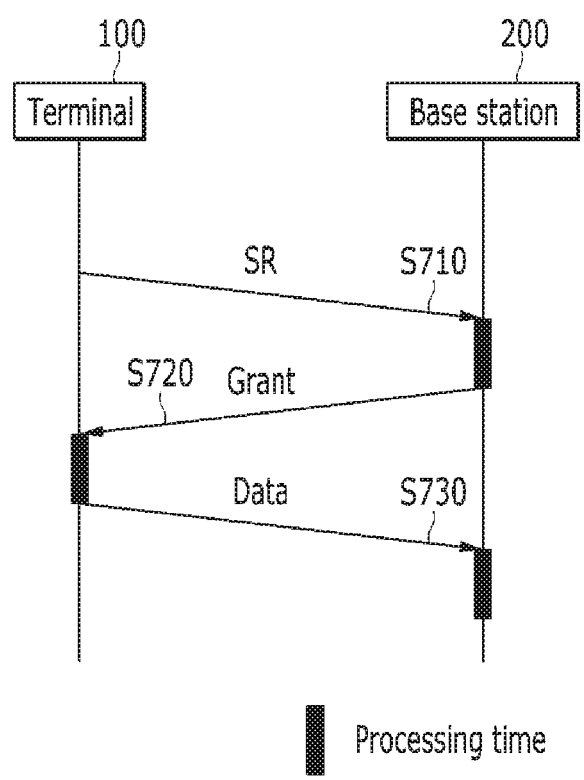
FIG. 7 is a flowchart illustrating an access method by a Scheduling Request (SR) using a PUCCH in existing LTE and LTE-A systems.

FIG. 7 is a flowchart illustrating an access method by a Scheduling Request (SR) using a PUCCH in existing LTE and LTE-A systems.

Referring to FIG. 7, when an activated connection exists between the terminal 100 and the base station 200 and when an SR signal that is intrinsically allocated to the terminal 100 exists, the terminal 100 transmits an SR that is intrinsically allocated to the terminal 100 to the base station 200 through a PUCCH (step 1, S710).

The base station 200 transmits grant, which is an uplink resource use authorization of the received SR to the terminal 100 (step 2, S720).

Thereafter, the terminal 100 transmits data to the base station 200 using an allocated uplink resource (step 3, S730).

An uplink access method by an SR using a PUCCH of FIG. 7 is substantially the same as an uplink access method of using a bandwidth request (BR) code of a mobile WiMAX communication system. The mobile WiMAX communication system transmits a BR code at step 1 (S710), allocates an uplink resource through a MAP at step 2 (S720), and finally transmits uplink data at step 3 (S730). Further, the LTE/LTE-A communication system or the mobile WiMAX communication system commonly uses a dedicated bandwidth request channel at step 1 (S710). For example, in the LTE/LTE-A communication system, the PUCCH is utilized for the dedicated bandwidth request channel.

In an exemplary embodiment of the present invention, in a communication system having a heterogeneous TTI-based radio resource, when performing an uplink access procedure using a dedicated bandwidth request channel, a method of using a normal TTI-based dedicated bandwidth request channel at step 1 (S710) and using a short TTI-based radio resource at step 2 (S720) and subsequent steps is suggested.

Figure 8:
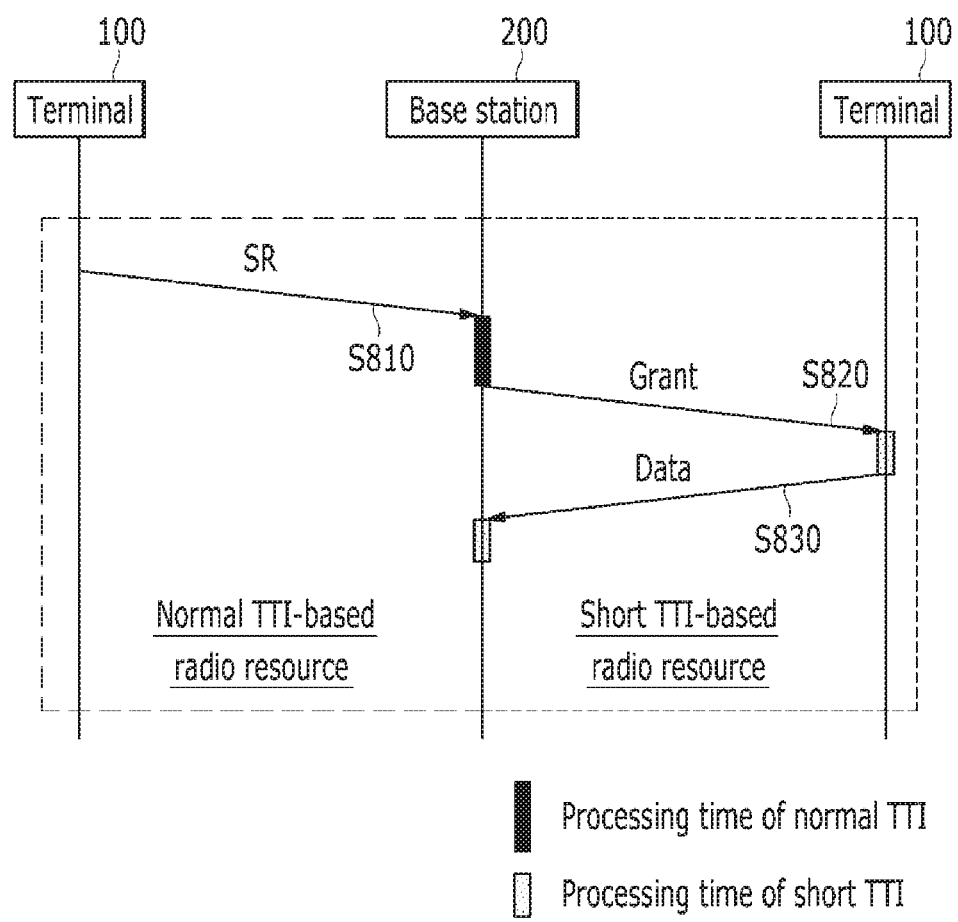
FIG. 8 is a flowchart illustrating an uplink access method of using a dedicated bandwidth request channel in a communication system having a heterogeneous TTI-based radio resource according to an exemplary embodiment of the present invention.

FIG. 8 is a flowchart illustrating an uplink access method of using a dedicated bandwidth request channel in a communication system having a heterogeneous TTI-based radio resource according to an exemplary embodiment of the present invention.

Unlike the foregoing random access, in an uplink access procedure using a dedicated bandwidth request channel, a bandwidth request signal using at step 1 is intrinsically allocated to each terminal through separate signaling between the terminal 100 and the base station 200. In existing LTE and LTE-A systems, a bandwidth request signal means an SR, and in a mobile WiMAX communication system, a bandwidth request signal means a BR code.

When a random terminal initially accesses and is registered to the base station, the base station 200 may determine whether the terminal is a terminal operating based on a short TTI or a terminal operating based on a normal TTI. Thereby, when the base station 200 intrinsically allocates a bandwidth request signal to the terminal 100, the base station 200 determines whether the terminal 100 is a terminal operating based on a normal TTI or a terminal operating based on a short TTI and stores a kind of the terminal 100 on a bandwidth request signal basis.

Referring to FIG. 8, the terminal 100 transmits an SR to the base station 200 using a dedicated bandwidth request channel within a normal TTI-based radio resource (step 1, S810).

The base station 200 determines whether the terminal 100 is a terminal operating based on a normal TTI or a terminal operating based on a short TTI based on the received SR. The base station 200 may determine whether the terminal 100 is a terminal operating based on a normal TTI or a terminal operating based on a short TTI based on a kind of the terminal 100 on a previously stored bandwidth request signal basis.

When the received SR is an SR of the terminal 100 operating based on a short TTI, the base station 200 transmits grant to the terminal 100 using a short TTI-based radio resource (step 2, S820). Alternatively, when the received SR is an SR of a terminal operating based on a normal TTI, the base station 200 transmits grant to the terminal 100 using a normal TTI-based radio resource.

The terminal 100 operating based on a short TTI performs step 1 (S810) and monitors only a short TTI-based radio resource, thereby receiving grant in which the base station 200 transmits at step 2 (S820) using a short TTI-based radio resource. Therefore, the terminal 100 operating based on a short TTI may perform entire operation of step 2 (S820) and subsequent steps using a short TTI-based radio resource.

The terminal 100 operating based on a normal TTI performs step 1 (S810) and monitors only a normal TTI-based radio resource, thereby receiving grant in which the base station 200 transmits at step 2 using a normal TTI-based radio resource and performing subsequent entire operations using a normal TTI-based radio resource.

In this way, when a communication system having a heterogeneous TTI-based radio resource performs an uplink access procedure using a dedicated bandwidth request channel, while guaranteeing operation of a terminal operating based on a normal TTI, the communication system enables a terminal operating based on a short TTI to perform entire operation of step 2 (S820) and subsequent steps using a short TTI-based radio resource. Therefore, compared with an uplink access procedure using a normal TTI-based radio resource, an access time that is taken to final data transmission is shortened.

Figure 9:
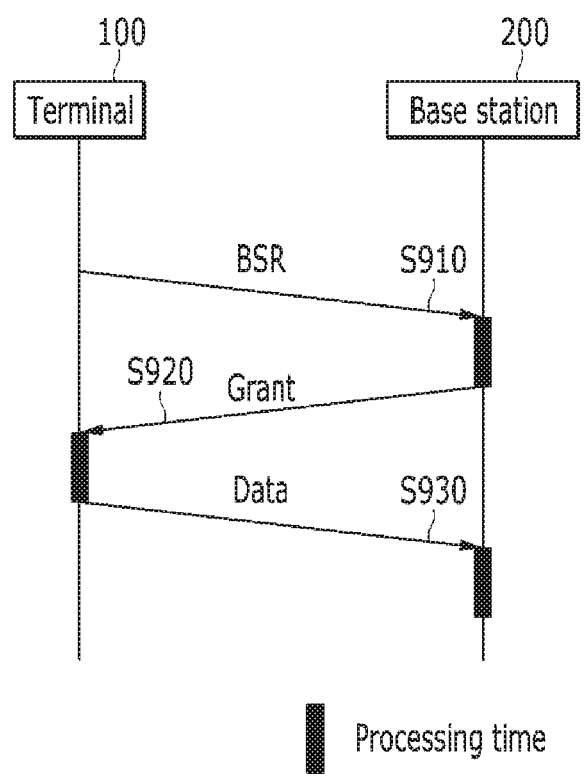
FIG. 9 is a flowchart illustrating an access method of using a Buffer Status Report (BSR) in existing LTE and LTE-A communication systems.

FIG. 9 is a flowchart illustrating an access method of using a Buffer Status Report (BSR) in existing LTE and LTE-A communication systems.

Referring to FIG. 9, when activated access exists between the terminal 100 and the base station 200 and when a Physical Uplink Shared Channel (PUSCH) resource that is allocated to the terminal 100 exists, the terminal 100 transmits a BSR, which is a message of a Medium Access Control (MAC) layer to the base station 200 using the allocated PUSCH resource (step 1, S910).

The base station 200 transmits grant, which is uplink resource use authorization of the received BSR to the terminal 100 (step 2, S920).

Thereafter, the terminal 100 transmits data to the base station 200 using an allocated uplink resource (step 3, S930).

An uplink access method of using a BSR of FIG. 9 is substantially the same as an access method of using a bandwidth request (BR) header of a mobile WiMAX communication system. The mobile WiMAX communication system transmits a BR header at step 1 (S910), allocates an uplink resource through a MAP at step 2 (S920), and finally transmits uplink data at step 3 (S930). Further, an LTE/LTE-A communication system or a mobile WiMAX communication system uses an uplink sharing traffic channel that is used for transmitting uplink traffic of terminals at step 1 (S910). In case of an LTE/LTE-A communication system, the uplink sharing traffic channel means a PUSCH.

When a communication system having a heterogeneous TTI-based radio resource according to an exemplary embodiment of the present invention performs an uplink access procedure using a BSR, which is a band request message of a MAC layer, a method of using an uplink sharing traffic channel based on a normal TTI at step 1 (S910) and using a short TTI-based radio resource at step 2 (S920) and subsequent steps is suggested.

Figure 10:
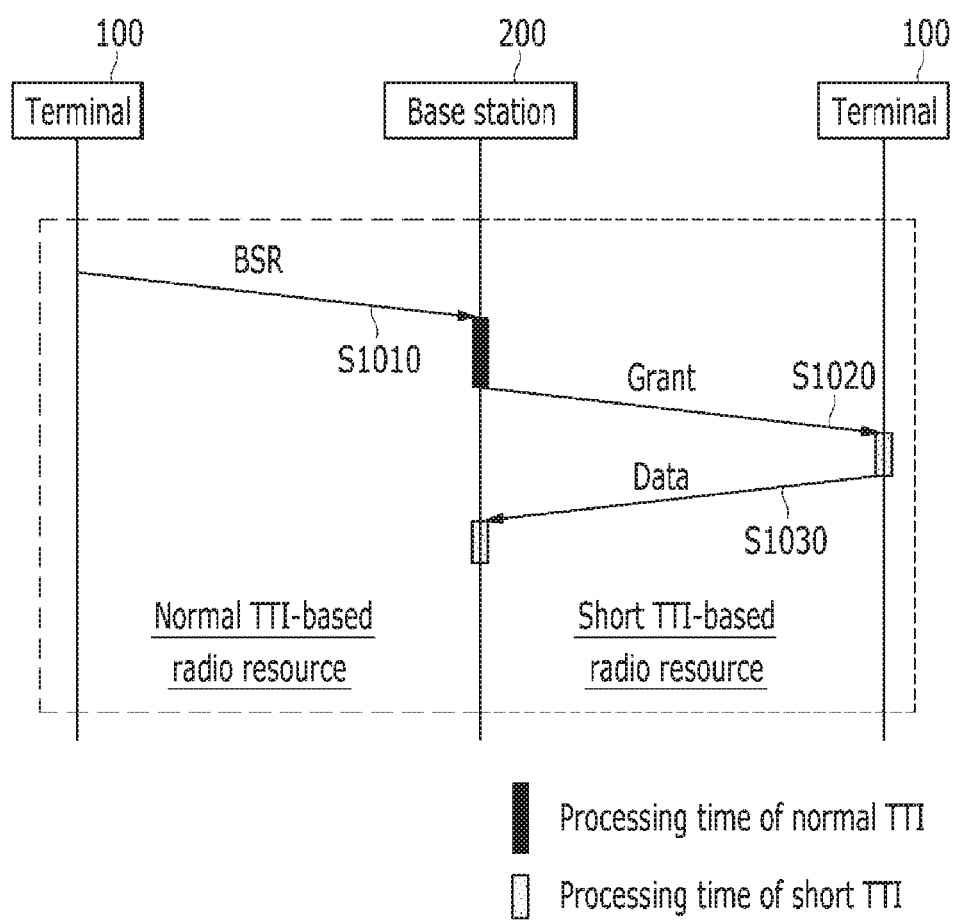
FIG. 10 is a flowchart illustrating an access method of using a BSR in a communication system having a heterogeneous TTI-based radio resource according to an exemplary embodiment of the present invention.

FIG. 10 is a flowchart illustrating an access method of using a BSR in a communication system having a heterogeneous TTI-based radio resource according to an exemplary embodiment of the present invention.

In a communication system having a heterogeneous TTI-based radio resource, in order to determine whether a terminal is a terminal operating based on a short TTI or a terminal operating based on a normal TTI, 1 bit of flag is used for a BSR.

Referring to FIG. 10, the terminal 100 operating based on a short TTI sets 1 bit of flag to the BSR and transmits the BSR to the base station 200 through a PUSCH (step 1, S1010). The terminal 100 operating based on a normal TTI may reset 1 bit of flag to the BSR and transmit the BSR to the base station 200 through a PUSCH. For example, the terminal 100 operating based on a short TTI may set 1 bit of flag to 1 to the BSR, transmit the BSR to the base station 200, and a terminal that may perform only operation based on a normal TTI may reset 1 bit of flag to 0 to the BSR and transmit the BSR to the base station 200.

When a flag value of the received BSR is set, the base station 200 transmits grant to the terminal 100 using a short TTI-based radio resource (step 2, S1020). Alternatively, when a flag value of the BSR is reset, the base station 200 transmits grant to the terminal 100 using a normal TTI-based radio resource.

The terminal 100 that may operate based on a short TTI performs step 1 (S1010) and monitors only a short TTI-based radio resource, thereby receiving grant in which the base station 200 transmits using the short TTI-based radio resource. Therefore, the terminal 100 that may operate based on a short TTI may perform entire operation of step 2 (S1020) and subsequent steps using a short TTI-based radio resource.

The terminal 100 operating based on a normal TTI performs step 1 (S1010) and monitors only a normal TTI-based radio resource, thereby receiving grant in which the base station 200 transmits using the normal TTI-based radio resource. Therefore, the terminal 100 operating based on a normal TTI may perform entire operation of step 2 and subsequent steps using a normal TTI-based radio resource.

In this way, when a communication system having a heterogeneous TTI-based radio resource performs uplink access using a BSR of an MAC layer, while guaranteeing operation of the terminal 100 operating based on a normal TTI, the communication system enables the terminal 100 operating based on a short TTI to perform entire operation of step 2 (S1020) and subsequent steps using a short TTI-based radio resource. Therefore, compared with an uplink access procedure using a normal TTI-based radio resource, an access time that is taken to final data transmission is shortened.

Yet another embodiment of the present invention may provide a method where the terminal 100 may operate based on a short TTI performs step 2 (S1020) and subsequent steps using the short TTI-based radio resource without investigating the flag in the BSR. Thus, the BSR does not need to have any flag indicating that a terminal is a terminal operating based on a short TTI or a terminal operating based on a normal TTI.

When the terminal 100 is initially accessed and is registered to the base station 200, the base station 200 may identify whether the terminal 100 is a terminal operating based on a short TTI or a terminal operating based on a normal TTI. The base station 200 allocates a dedicated uplink resource using a unique identifier of the terminal 100 in order to transmit the BSR by the terminal 100. In this case, the base station 200 stores a type of the terminal 100 indicating whether the terminal 100 is a terminal operating based on a short TTI corresponding to the unique identifier of the terminal 100. This method uses types of terminals stored corresponding to unique identifiers of the terminals.

The terminal 100 that may operate based on the short TTI, transmits the BSR to the base station 200 and the base station 200 may confirm a unique identifier of the terminal 100 from the received BSR. The base station 200 may determine a type of the terminal 100 using the unique identifier of the terminal 100, by referring to the types of terminals stored corresponding to unique identifiers of the terminals.

When the received BSR is a BSR of terminal 100 that may operate based on a short TTI, the base station 200 transmits grant to the terminal 100 using a short TTI-based radio resource (S1020). Alternatively, when the received BSR is a BSR of terminal 100 that may operate based on a normal TTI, the base station 200 transmits grant to the terminal 100 using a normal TTI-based radio resource.

This method uses information stored when the terminal 100 is initially accessed and is registered to the base station 200 and is different from a method that sets a flag to the BSR in order to determine whether a terminal 100 is a terminal operating based on a short TTI or a terminal operating based on a normal TTI by the base station 200.

Figure 11:
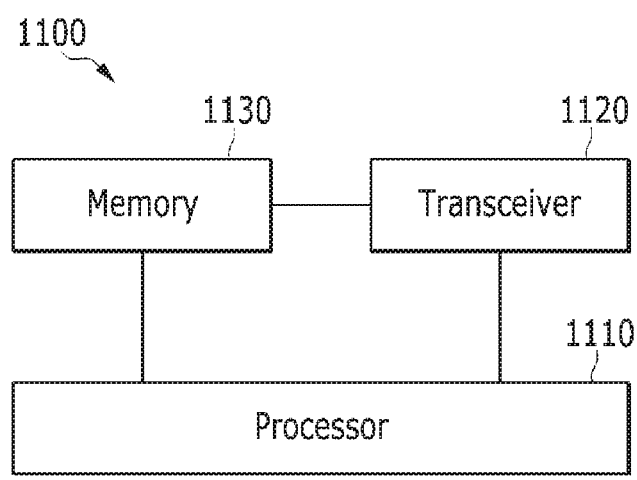
FIG. 11 is a block diagram illustrating a configuration of a fast access apparatus of a terminal according to an exemplary embodiment of the present invention.

FIG. 11 is a block diagram illustrating a configuration of a fast access apparatus of a terminal according to an exemplary embodiment of the present invention.

Referring to FIG. 11, a fast access apparatus 1100 of the terminal 100 includes a processor 1110, a transceiver 1120, and a memory 1130.

The processor 1110 performs an uplink access operation and function of the terminal 100 that is described with reference to FIGS. 4, 5, 6, 8, and 10. The processor 1110 performs step 1 of an uplink access procedure using an physical uplink channel that is allocated to a normal TTI-based radio resource, and when the terminal 100 may operate based on a short TTI, until finally transmitting data from step 2 of an uplink access procedure, the processor 1110 performs an uplink access procedure using a short TTI-based radio resource. When the terminal 100 operates based on a normal TTI, the processor 1110 performs an uplink access procedure using a normal TTI-based radio resource until finally transmitting data from step 2 of an uplink access procedure.

The transceiver 1120 is connected with the processor 1110 and transmits and receives a wireless signal for uplink access to and from the base station 200.

The memory 1130 is connected with the processor 1110 and stores various information that is related to operation of the processor 1110.

Figure 12:
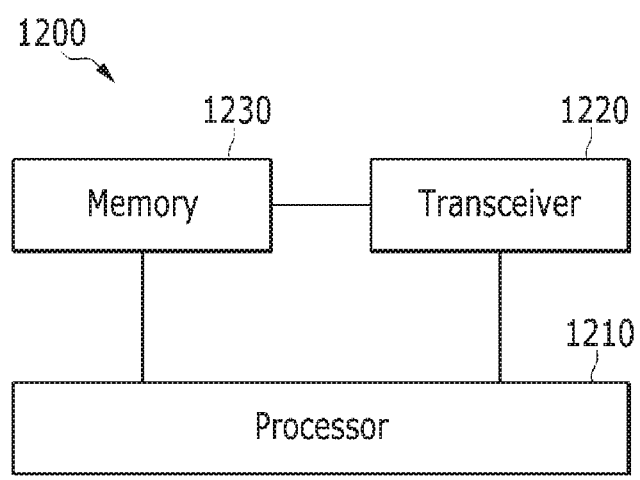
FIG. 12 is a block diagram illustrating a configuration of a fast access support apparatus of a base station according to an exemplary embodiment of the present invention.

FIG. 12 is a block diagram illustrating a configuration of a fast access support apparatus of a base station according to an exemplary embodiment of the present invention.

Referring to FIG. 12, a fast access support apparatus 1200 of the base station 200 includes a processor 1210, a transceiver 1220, and a memory 1230.

The processor 1210 performs an operation and function of the base station 200 for uplink access of the terminal 100 that is described with reference to FIGS. 4, 5, 6, 8, and 10. The processor 1210 determines whether the terminal 100 operates based on a short TTI or operates based on a normal TTI, and if the terminal 100 operates based on a short TTI, the processor 1210 performs step 2 and subsequent steps of an uplink access procedure using a short TTI-based radio resource, and if the terminal 100 operates based on a normal TTI, the processor 1210 performs step 2 and subsequent steps of an uplink access procedure using a normal TTI-based radio resource.

The transceiver 1220 is connected with the processor 1210 and transmits and receives a wireless signal for uplink access to and from the base station 200.

The memory 1230 is connected with the processor 1210 and stores various information that is related to operation of the processor 1210. The memory 1230 may store a kind of a terminal representing whether the terminal 100 is a terminal operating based on a normal TTI or a terminal operating based on a short TTI.

According to an exemplary embodiment of the present invention, in a communication system having a radio resource based on two Transmission Time Intervals (TTI) having different time lengths, in an uplink access procedure necessary when a terminal transmits data to a base station, by using a radio resource based on a TTI having a short time length among two TTIs from a second step, compared with a case of using a radio resource based on a TTI having a long time length, fast access can be performed through latency reduction.

Further, at an uplink access procedure, at a first step, by enabling to use a physical channel that is designed to be appropriate to a radio resource based on a TTI having a long length among two TTIs, when performing the first step using a radio resource based on a TTI having a small length, a new physical channel that is designed to be appropriate to a radio resource based on a TTI having a short necessary length is not required. Thereby, a system overhead, complexity of a design, and increase of a product cost necessary for adaptation of a new physical channel that is designed to be appropriate to a radio resource based on TTI having a short length can be removed.

Further, by enabling a communication system that can perform a first step in a short TTI-based radio resource to perform the first step using a radio resource based on a TTI having a long length and to perform a second step and subsequent steps in a short TTI-based radio resource, a load of a short TTI-based radio resource necessary for the first step can be distributed.

An exemplary embodiment of the present invention may not only be embodied through the above-described apparatus and/or method but may also be embodied through a program that executes a function corresponding to a configuration of the exemplary embodiment of the present invention or through a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An uplink access method by a terminal of a communication system, the uplink access method comprising:
    transmitting a random access preamble using a first resource that is based on a first Transmission Time Interval (TTI) having a first time to a base station;
    receiving a random access response using a second radio resource that is based on a second TTI having a second time length smaller than the first time length from the base station;
    transmitting a Layer 2 or Layer 3 message using the second radio resource to the base station;
    receiving an uplink resource use authorization signal using the second radio resource from the base station; and
    transmitting an uplink data using a radio source that is allocated by the uplink resource authorization signal.

2. The uplink access method of claim 1, wherein
    the first resource is a resource that is allocated for a dedicated random access channel.

3. The uplink access method of claim 1, wherein the layer 2 message is a Buffer Status Report and the uplink resource use authorization signal is a grant signal.

* * * * *